United States Patent [19]

Olashaw et al.

[11] 4,363,528
[45] Dec. 14, 1982

[54] SWITCHBOARD CUBICLE DOOR HINGE AND LATCH ARRANGEMENT

[75] Inventors: William F. Olashaw, Plainville; James H. Postlethwait, Weatogue; Jeffrey L. Winterstein, Burlington, all of Conn.

[73] Assignee: General Electric Company, New York, N.Y.

[21] Appl. No.: 191,057

[22] Filed: Sep. 25, 1980

[51] Int. Cl.³ .................. A47B 81/00; E05C 7/00; E05D 7/08
[52] U.S. Cl. .................. 312/292; 312/302; 312/222; 292/42; 16/378
[58] Field of Search .......... 312/292, 217, 222, 202, 312/302, 298, 308; 292/42; 49/371; 16/378, 379

[56] References Cited

U.S. PATENT DOCUMENTS

| | | | |
|---|---|---|---|
| 1,047,828 | 12/1912 | Morgner | 292/42 |
| 1,766,162 | 6/1930 | Young | 292/42 |
| 2,089,327 | 8/1937 | Barker | 16/379 |
| 2,104,939 | 1/1938 | Whalen | 312/302 |
| 2,803,512 | 8/1957 | Band | 312/292 |
| 2,967,001 | 1/1961 | Landon | 292/42 |
| 3,313,064 | 4/1967 | Kirby | 16/378 |
| 4,109,346 | 8/1978 | Strozier | 16/379 |

FOREIGN PATENT DOCUMENTS

| | | | |
|---|---|---|---|
| 966157 | 3/1950 | France | 292/42 |
| 1354013 | 1/1964 | France | 16/378 |

Primary Examiner—Victor N. Sakran
Attorney, Agent, or Firm—Richard Menelly; Walter C. Bernkopf; Fred Jacob

[57] ABSTRACT

In an electrical switchboard vertical section, vertically adjacent pairs of cubicle doors are mounted by common hinge blocks located adjacent door corners and releaseably, latchingly retained in their closed positions by common latch blocks located adjacent opposed door corners. Horizontally aligned pairs of hinge and latch blocks additionally serve as mounts for instrument compartments located in the spaces available between vertically adjacent doors; these compartments slidingly accomodating drawout instrument drawers.

9 Claims, 9 Drawing Figures

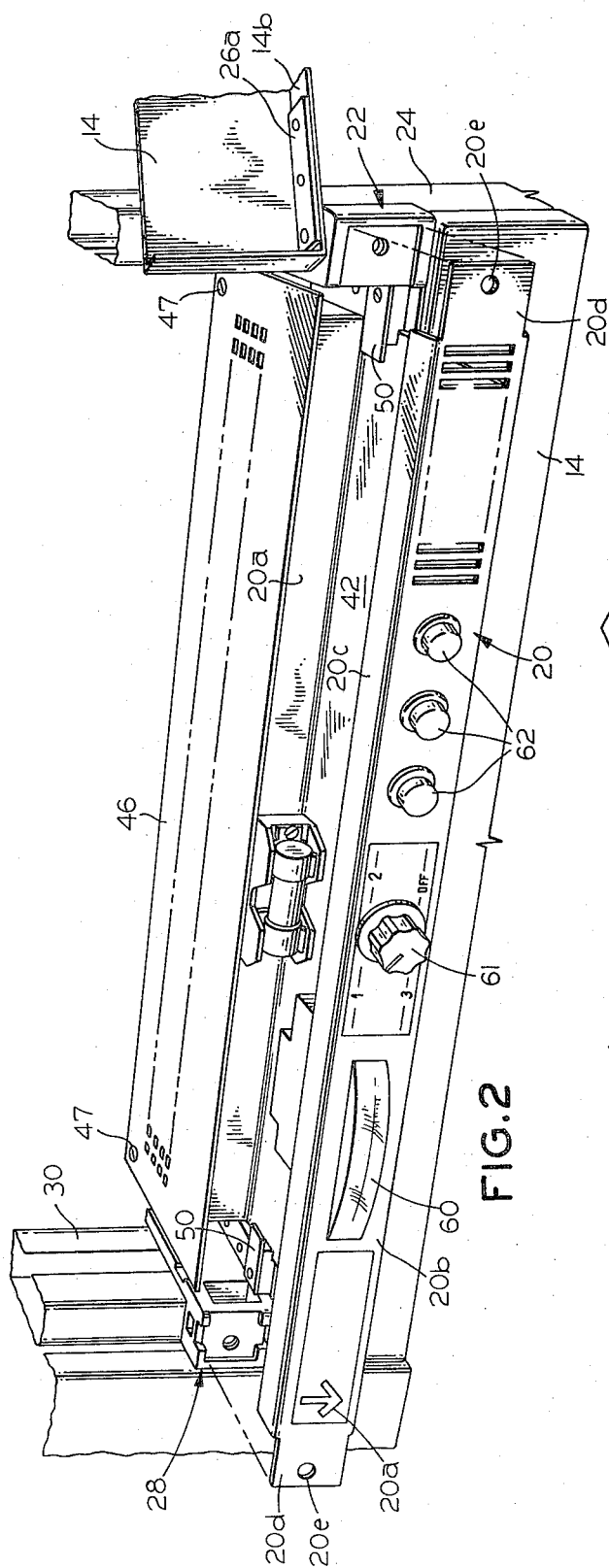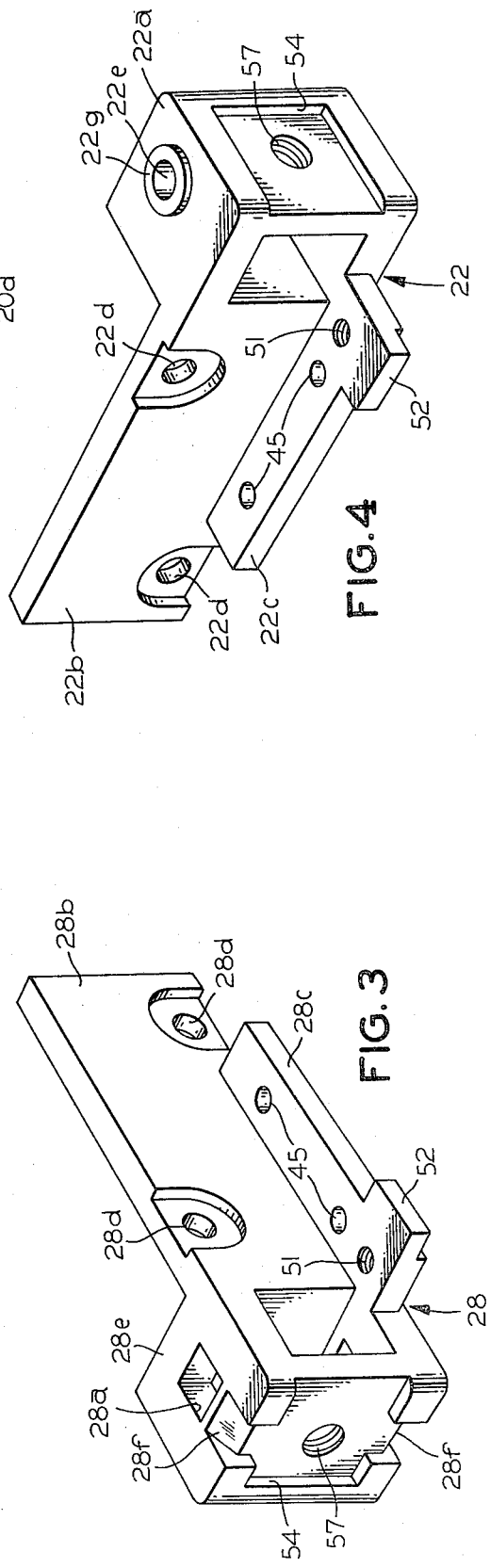

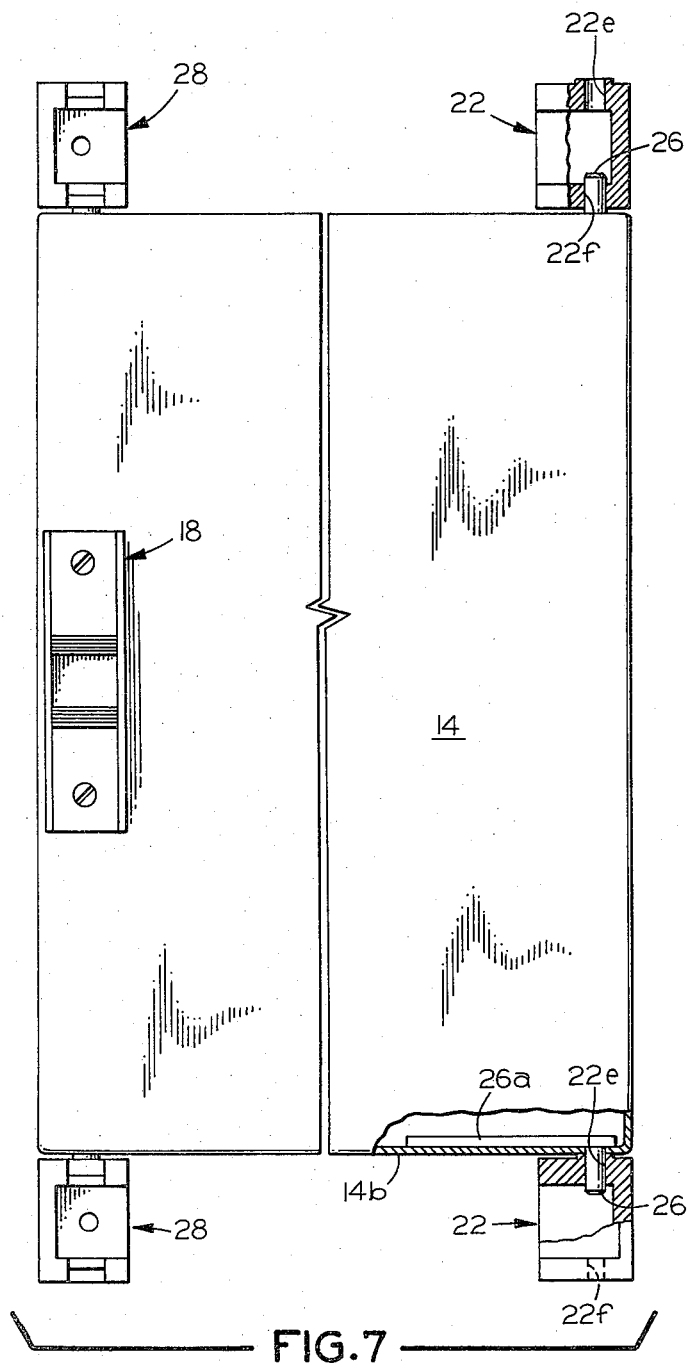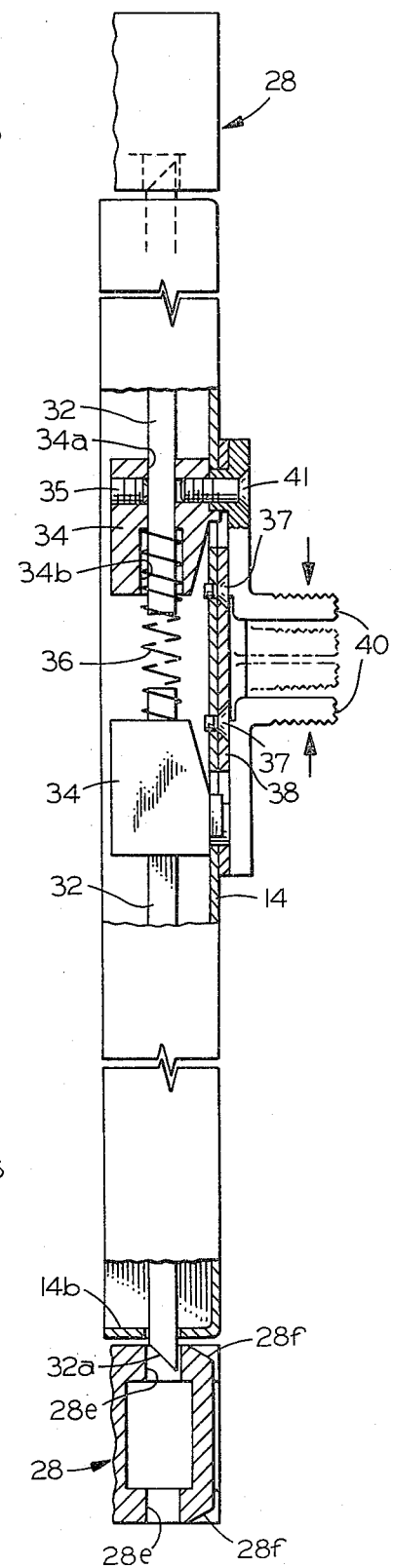
FIG. 7
FIG. 8

SWITCHBOARD CUBICLE DOOR HINGE AND LATCH ARRANGEMENT

BACKGROUND OF INVENTION

The present invention relates to electrical switchboards and particularly to improved means for hinge mounting and latching cubicle doors of a switchboard vertical section.

Traditionally, the doors of a switchboard vertical section affording separate access to the individual compartments or cubicles thereof have been separately, side mounted by conventional hinges consisting of complimenting hinge plates secured to each door and the switchboard frame and joined by a hinge pin. In the case of large cubicles, three and perhaps four separate hinges are required to mount the relatively heavy cubicle door. Alternatively, a continuous side hinge may be used.

In addition, latches are required to releasably secure the doors in their closed positions. Consequently, considerable numbers of hardware pieces must be assembled simply to adapt the cubicle doors to a switchboard vertical section.

For certain switchboard designs, small instrument compartments are provided at locations between vertically adjacent cubicles. These compartments contain, for example, ammeters for indicating the magnitudes of the current flowing through the electrical equipment installed in the various cubicles, indicator lights for indicating the status of the switchboard electrical equipment and their connected cloads, etc. These instrument compartments call for additional mounting provisions and thus further assembly procedures.

It is accordingly an object of the present invention to provide improved means for adapting cubicle doors to a vertical electrical switchboard section.

A further object is to provide improved means of the above-character for hinge mounting plural doors to a switchboard frame for individual movement between open and closed positions with respect to the various cubicles of a switchboard vertical section.

Another object is to provide improved means of the above-character for individually releasably latching the cubicle doors in their closed positions.

Yet another object is to provide the improved cubicle door hinge mounting and latching means of the above character which are further adapted to mount partitioning members defining instrument compartments at locations intermediate vertically adjacent cubicle doors.

Still another object is to provide an improved cubicle door hinge and latch arrangement of the above character which is efficient in construction and convenient to assemble to and disassemble from a switchboard vertical section.

Other objects will in part be obvious and in part appear hereinafter.

SUMMARY OF THE INVENTION

In accordance with the present invention, there is provided an improved structural arrangement for mounting the plural cubicle doors of an electrical switchboard vertical section. Generally stated, this arrangement provides for the utilization of uniquely structured hinge blocks secured to an upright switchboard frame member at locations intermediate vertically adjacent cubicles and provided with opposed sockets for receipt of hinge pins mounted by doors accessing the vertically adjacent cubicles. Thus, vertically adjacent cubicle doors share a common hinge block. Consequently, the requisite number of hinge blocks exceeds the number of doors in a vertical section by one, and thus mounting of the cubicle doors to the switchboard section is considerably simplified.

Mounted to another switchboard upright frame member in horizontally aligned relation with each hinge block is a similarly constructed latch block provided with opposed latch notches. Assembled to each cubicle door is a digitally operable latch assembly consisting of opposed vertically extending latch rods whose tips are receivable in the notches of the two latch block stationed at the upper and lower opening side corners of each door to securely latch the doors in their closed positions. As in the case of the hinge blocks, vertically adjacent doors share a common latch block. To access a particular cubicle, the latch rods of the door thereto are simply retracted against the bias of a spring to disengage their tips from the latch block notches, and the door is swung open on its hinge blocks.

In accordance with an additional feature of the present invention, the unique locations of the hinge and latch blocks between each vertically adjacent pair of cubicle doors renders them ideally suited to additionally serve as mounting points for partitioning members defining an instrument compartment. Slidingly accommodating within each instrument compartment is a drawer containing various instruments and indicators wired into the electrical equipment installed in one of the adjacent cubicles. The instrument drawers are normally secured in their closed positions to the latch and hinge blocks, but may be pulled out to their open positions for maintenance and inspection.

The invention accordingly comprises the features of construction and arrangement of parts which will be exemplified in the construction hereinafter set forth, and the scope of the invention will be indicated in the claims.

For a better understanding of the nature and objects of the present invention, reference should be had to the following detailed description taken in conjunction with the accompanying drawings, in which:

FIG. 2 is an enlarged, fragmentary perspective view of a portion of a cubicle included in the switchboard vertical section of FIG. 1;

FIG. 3 is a perspective view of a cubicle door latch block constructed in accordance with the present invention;

FIG. 4 is a perspective view of a cubicle door hinge block constructed in accordance with the present invention;

FIG. 7 is a front view, partially broken away, of a cubicle door included in the switchboard vertical section of FIG. 1;

FIG. 8 is an edge view, partially broken away, of the cubicle door of FIG. 7.

Corresponding reference numerals refer to like parts throughout the several views of the drawings.

DETAILED DESCRIPTION

Figure 1:
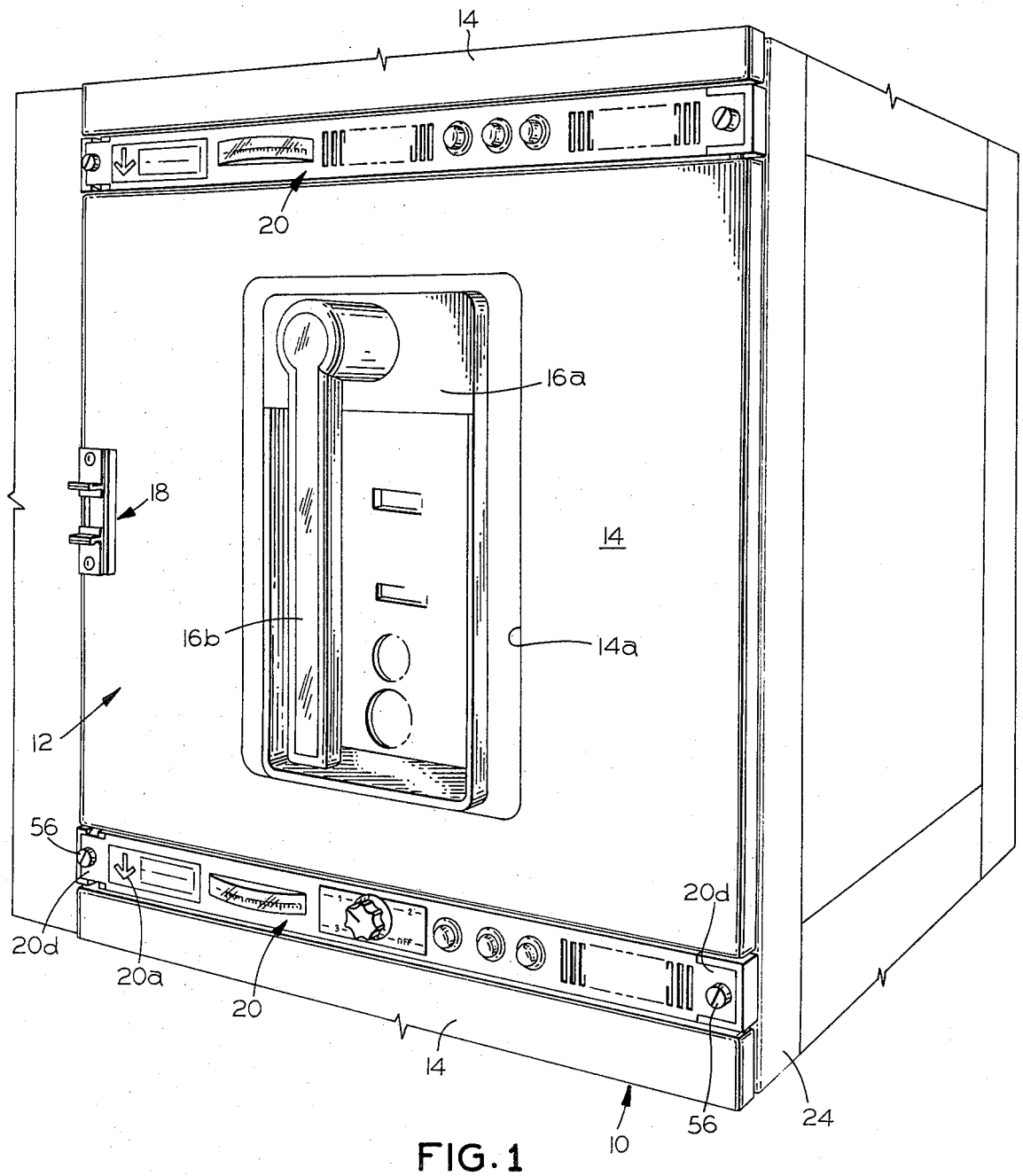
FIG. 1 is a fragmentary perspective view of an electrical switchboard vertical section incorporating the cubicle door hinging and latching arrangement of the present invention.

The present invention is embodied in an electrical switchboard vertical section generally indicated at 10 and including a vertical array of compartments or cubicles, one of which is depicted in full and generally indicated at 12 in FIG. 1. Each cubicle is accessed by a door 14 hinged at its right side as seen in FIG. 2. At least one door may be provided with a central opening 14a through which protrudes the escutcheon 16a and operating handle 16b of an electrical device, such as an industrial circuit breaker, accommodated within the cubicle. A digitcally operable latch assembly, generally indicated at 18, releasably detains door 14 in its illustrated closed position to seal off the frontal opening into the cubicle. Situated between each vertically adjacent pair of cubicles in the gap between their doors 14 is an instrument drawer, generally indicated at 20, containing components wired into the cubicle immediately below it, as indicated by an arrow indication 20a.

To individually mount each cubicle door 14 to switchboard vertical section 10, a pair of identical, cast metal hinge blocks, generally indicated at 22 in FIG. 4, are utilized. Each hinge block is integrally provided with a cubical frontal portion 22a, a rearwardly extending mounting flange 22b, and a laterally extending ledge 22c. Mounting holes 22d, formed in flange 22b, accommodate bolts (not shown) for securing each hinge block in vertically spaced relation, corresponding to the door heights, to a right front switchboard frame corner post 24 seen in FIGS. 1 and 2. As seen in FIG. 7, upper and lower hinge pins 26 are mounted by plates 26a bolted to the inwardly turned, upper and lowr door flanges 14b adjacent the right corners of the door; the hinge pins protruding upwardly and downwardly through holes formed in these door flanges.

Returning to FIG. 4, it is seen that the hinge blocks 22 further include a bore or socket 22e formed in the upper surface of cubical portion 22a and, as seen in FIG. 7, a vertically aligned second socket 22f formed in the lower cubical portion surface.

To mount a cubicle door 14, it is positioned with its right corners vertically aligned between adjacent hinge blocks, and plates 26a are bolted to the door flanges 14b with their hinge pins 26 received in hinge block sockets 22e and 22f. The other doors are mounted in the same manner and can readily be dismounted on an individual basis simply by unbolting the hinge pin plates. It is thus seen that, pursuant to an important feature of the present invention vertically adjacent pairs of cubicle doors share a common hinge block. Thus, considerable savings in fabrication and assembly are realized. To reduce frictional drag on the swinging movement of doors 14, a boss 22g surrounding hinge block socket 22e is provided to support the lower door flange 14b in elevated, spaced relation to the upper surface of the hinge block cubical portion 22a.

Turning to FIG. 3, there is shown a cast metal latch block, generally indicated at 28 and of generally the same configuration as hinge block 22. Thus, the latch block includes a cubical frontal portion 28a, an integral, rearwardly extending mounting flange 28b, and a laterally extending ledge 28c. Holes 28d, formed in the mounting flange, accommodate bolts (not shown) for fastening a latch block to the other front corner post 30 of the switchboard vertical section 10, as seen in FIGS. 1 and 2. The vertical mounting locations of the latch blocks to corner post 30 correspond to the vertical mounting locations of hinge blocks 22 to corner post 24. Formed in the upper and lower surfaces of latch block cubical portion 28a are vertically opposed recesses or notches 28e (see also FIGS. 7 and 8) which are confronted by self-latching cam surfaces 28f.

Figure 9:
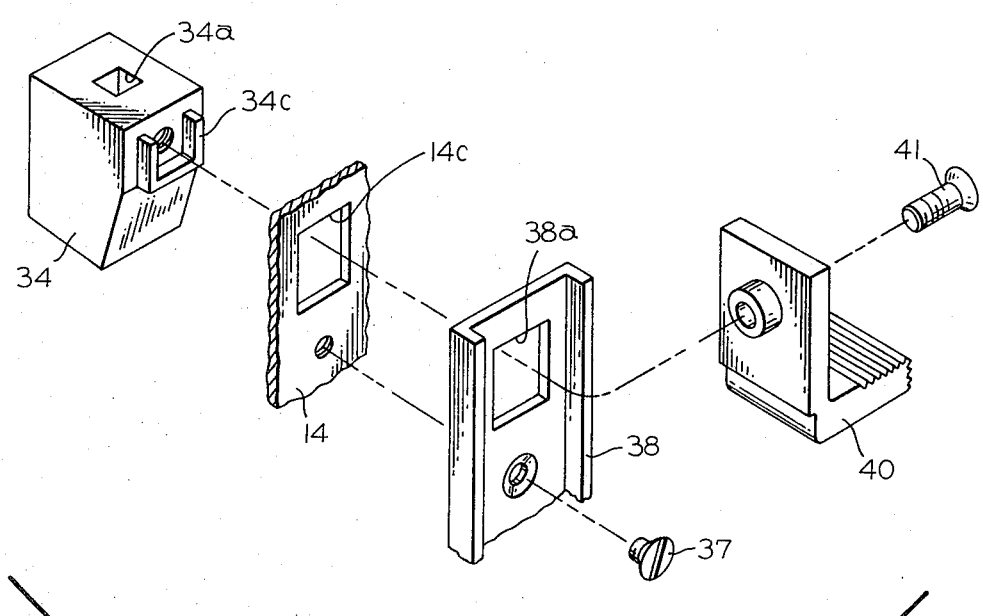
FIG. 9 is an exploded perspective assembly view of a portion of a latch assembly utilized with the cubicle door of FIGS. 7 and 8.

Co-acting with latch blocks 28 are the latch assemblies 18 assembled to each of the cubicle doors 14. As seen in FIGS. 8 and 9, opposed, vertically oriented, latch rods 32, preferably rectangular in cross-section, extend upwardly and downwardly to project their terminations through openings in the upper and lower door flanges 14b and into notches 28e in the latch blocks mounted immediately above and below the left corners of the door. The latch rod terminations are cut at an angle, as indicated at 32a, to coact with latch block cam surfaces 28f in accommodating self-latch operation of latch assembly 18, as well as become apparent. The inner end portions of the latch rods are inserted through confirming bores 34a in separate holders 34 (FIGS. 8 and 9) where they are held by set screws 35. The bores are countersunk, as indicated at 34b, to provide opposed seating for a compression spring 36 acting to bias the latch rods in opposite vertical directions.

As best seen in FIG. 9, each latch rod holder 34 is formed having a U-shaped rib formation 34c which is received through a separate rectangular opening 14c in door 14. Secured to the door by screws 37 is a vertically elongated molded pastic trim plate 38 having vertically spaced, rectangular openings 38a in registry with door openings 14c. A pair of L-shaped digital latch operators 40 are individually fastened to the two latch rod holders by screws 41. Rib formations 34c also project into trim plate openings 38a to serve as stops and guides controlling the vertically reciprocating movements of the latch rods induced by pinching latch operators 40 together to concurrently withdraw the latch rod terminations from notches 28e in latch blocks 28, thereby unlatching door 14 for opening movement, and by compression spring 36 to return the latch rods to their vertically extended positions when the latch operators are released. It will be appreciated that the door can be closed and latched without manipulation of the latch operators by virtue of the detenting action of self-latching cam surfaces 28f of the latch blocks on the angular terminations of the latch rods 32. As in the case of the hinge blocks 22, vertically adjacent cubicle doors share a common latch block 28.

Figure 5:
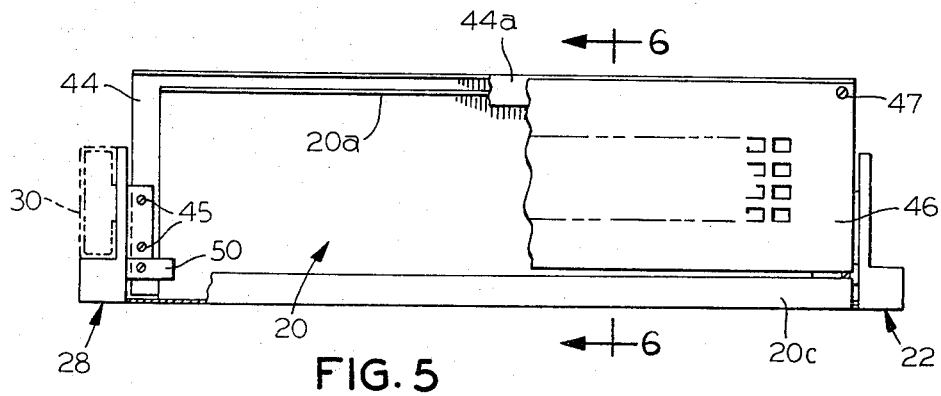
FIG. 5 is a plan view of an instrument compartment incorporated in the switchboard vertical section of FIG. 1.
Figure 6:
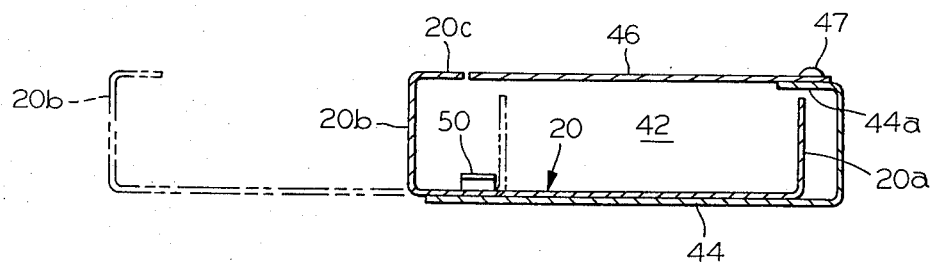
FIG. 6 is a sectional view taken along lines 6—6 of FIG. 5.

As an additional feature of the present invention, each horizontally aligned pair of hinge and latch blocks is utilized as mounting points for an instrument compartment accommodating an instrument drawer 20 seen in FIG. 1. As best seen in FIGS. 2, 5 and 6, each instrument compartment, generally indicated at 42, includes a sheet metal floor 44 which is bolted to the undersides of ledges 22c and 28c of a horizontally aligned pair of hinge and latch blocks, respectively, utilizing tapped holes 45 therein. The rearward edge portion of the floor is turned upwardly and then back to provide a continuous, horizontally extending flange 44a to which a sheet metal cover 46 is secured using sheet metal screws 47. Slidingly received within the compartment created by floor 44 and cover 46 is instrument drawer 20 having a turned up back 20a, and a turned up front 20b terminating in a turned back flange 20c which abuts the front edge of cover 46 when the tray is closed (FIG. 6) to effectively prevent the entry of foreign objects. A stop 50, bolted to one or both of the hinge and latch blocks using tapped holes 51, (FIG. 3 and 4), is in position to engage the drawer back 20a and thus limit the extent of opening or drawout movement of the drawer. From FIG. 5, it is seen that the side edges of the hinge and latch block ledges 22c and 28c, respectively, serve as guides for the lateral drawer edges, thus ensuring essential unsecured drawout movement. Moreover, the lateral edges of the drawer are trapper under lugs 52 integrally formed with the hinge and latch blocks to further control drawout movement of the drawer between its open and closed positions.

As seen in FIGS. 1 and 2, laterally extending ears 20d integrally formed with drawer front 20b are dimensioned for receipt in recesses 54 formed in the front surfaces of the hinge and latch block cubical positions. Hole 20e in these ears serve to capture thumbscrews 56 (FIG. 1) which are threaded into tapped holes 57 in the hinge and latch blocks to secure drawer 20 in its closed position.

Drawer 20 serves to mount various electrical components, such as an ammeter 60, ammeter switch 61, indicators 62, etc., all wired into the electrical equipment installed in the cubicle 12 immediately below. Performations in cover 46 and drawer front 20b afford ventilation for these components.

It will thus be seen that the objects set forth above, among those made apparent in the preceding description, are efficiently attained and, since certain changes may be made in the above construction without departing from the scope of the invention, it is intended that the matter contained in the above description or shown in the accompanying drawings shall be interpreted as illustrative and not in a limiting sense.

Having described our invention, what we claim as new and desire to secure by Letters Patent is:

1. In an electrical switchboard vertical section comprising a vertical array of cubicles accommodating electrical equipment; the arrangement including, in combination:

a plurality of doors, one for each cubicle;
   upper and lower hinge pins assembled to each said door in vertical alignment adjacent corresponding upper and lower corners thereof;
   upper and lower hinge blocks for each cubicle assembled to the switchboard in vertical alignment, each said hinge block including a pair of vertically aligned upwardly and downwardly opening sockets for accommodating said hinge pins, adjacent upper and lower hinge pins of each vertically adjacent pair of said doors being received in said downwardly opening and upwardly opening sockets, respectively, of one of said hinge blocks, whereby to mount said doors for swinging movement between open and closed positions;
   a latch assembly mounted to each said door, each said assembly including a pair of vertically aligned upwardly and downwardly extending latch rods having terminations respectively projectable beyond upper and lower door edges, and a manual operator for selectively retracting said latch rod pair;
   a plurality of latch blocks assembled to the switchboard in common vertical alignment and respective, individual alignment with each said hinge block, each said latch block including a pair of vertically aligned upwardly and downwardly opening notches, adjacent upwardly and downwardly extending latch rod terminations of each vertically adjacent pair of said doors being respectively, retractably received in said downwardly and upwardly opening notches of one of said blocks, whereby to releasably latch said doors in their closed positions; and
   partition members mounted by at least one horizontally aligned pair of said hinge and latch blocks to define an instrument compartment at a location intermediate vertically adjacent doors.

2. The arrangement defined in claim 1, wherein said hinge and latch blocks are each integrally formed with a mounting flange facilitating assembly to upright switchboard frame members situated at the front corners of the switchboard vertical section.

3. The arrangement defined in claim 1, wherein each said hinge block further includes a raised boss surrounding said upwardly opening socket thereof.

4. The arrangement defined in claim 1, wherein said hinge pins are removably bolted to said doors to accommodate dismounting of individual ones of said doors.

5. The arrangement defined in claim 1, which further includes an instrument mounting drawer slidingly received in said instrument compartment.

6. The arrangement defined in claim 5, wherein said horizontally aligned pair of hinge and latch blocks are each equipped with means accommodating fasteners for releasably securing said instrument drawer in its closed position.

7. The arrangement defined in claim 6, wherein at least one of said horizontally aligned pair of hinge and latch blocks is equipped with means accommodating a stop to limit the extent of opening movement of said instrument drainer.

8. The arrangement defined in claim 6, wherein said hinge pins are removably bolted to said doors to accommodate dismounting of individual ones of said doors.

9. The arrangement defined in claim 6, wherein said horizontally aligned pair of hinge and latch blocks are integrally formed with ledges to which at least one of said instrument compartment defining partition members is bolted.

* * * * *